United States Patent
Jalluri et al.

(10) Patent No.: US 10,365,633 B2
(45) Date of Patent: Jul. 30, 2019

(54) METHOD FOR GENERATING CNC MACHINE OFFSET BASED ON THERMAL MODEL

(71) Applicant: Ford Motor Company, Dearborn, MI (US)

(72) Inventors: Chandra Sekhar Jalluri, Canton, MI (US); Himanshu Rajoria, Canton, MI (US); Jon Guske, New Baltimore, MI (US); Michael Allen Schmitz, Fowlerville, MI (US)

(73) Assignee: Ford Motor Company, Dearborn, MI (US)

( * ) Notice: Subject to any disclaimer, the term of this patent is extended or adjusted under 35 U.S.C. 154(b) by 56 days.

(21) Appl. No.: 15/622,382

(22) Filed: Jun. 14, 2017

(65) Prior Publication Data

US 2018/0364677 A1    Dec. 20, 2018

(51) Int. Cl.
    G05B 19/4063    (2006.01)
    G05B 19/19      (2006.01)
    G01K 1/14       (2006.01)

(52) U.S. Cl.
    CPC .......... *G05B 19/4063* (2013.01); *G01K 1/14* (2013.01); *G05B 19/19* (2013.01); *G05B 2219/34015* (2013.01); *G05B 2219/39192* (2013.01)

(58) Field of Classification Search
    None
    See application file for complete search history.

(56) References Cited

U.S. PATENT DOCUMENTS

| 4,808,048 | A | | 2/1989 | Miller | |
|---|---|---|---|---|---|
| 4,919,575 | A | | 4/1990 | Yoshimi et al. | |
| 5,353,768 | A | * | 10/1994 | Messih | F02D 41/045 123/491 |
| 5,779,405 | A | | 7/1998 | Aiso et al. | |
| 6,519,860 | B1 | * | 2/2003 | Bieg | B23H 7/26 33/1 PT |
| 6,532,680 | B2 | * | 3/2003 | Braasch | G01B 7/16 33/503 |
| 6,681,495 | B2 | * | 1/2004 | Masayuki | B25J 9/1692 33/501 |

(Continued)

FOREIGN PATENT DOCUMENTS

CN    202639856    1/2013

OTHER PUBLICATIONS

Jalluri, Chandra et al., Artifact Based Assessment of CNC Machine Thermal Growth and Compensation, SAE International, vol. 10(2), pp. 227-232, published Apr. 2017.

*Primary Examiner* — Ramesh B Patel
(74) *Attorney, Agent, or Firm* — Burris Law, PLLC

(57) ABSTRACT

The present disclosure generally describes a method for processing a workpiece in a machine, where the method determines an offset of the machine and adjusts for the offset during production operation. In one form, the method includes logging offset data of the machine over a period of operational time having varying thermal conditions, and comparing the logged offset data against a thermal model, where the thermal model is generated based on a probing routine and dry cycling for a plurality of test cycles on a calibration artifact. Based on the comparing, the method estimates offsets for the machine and adjusts offsets of the machine during operation.

20 Claims, 4 Drawing Sheets

(56) References Cited

U.S. PATENT DOCUMENTS

| | | | |
|---|---|---|---|
| 6,720,567 B2* | 4/2004 | Fordahl | B23K 26/048 |
| | | | 250/559.29 |
| 6,748,790 B2* | 6/2004 | Abbe | B25J 9/1692 |
| | | | 73/1.79 |
| 6,866,451 B2* | 3/2005 | Braasch | G01B 7/20 |
| | | | 33/702 |
| 6,961,628 B2* | 11/2005 | Yutkowitz | G05B 11/28 |
| | | | 38/39 |
| 6,973,734 B2* | 12/2005 | Raab | B23Q 35/04 |
| | | | 33/1 N |
| 7,383,097 B2 | 6/2008 | Jalluri et al. | |
| 7,591,078 B2* | 9/2009 | Crampton | B25J 13/088 |
| | | | 33/503 |
| 7,854,575 B2 | 12/2010 | Nishizaki et al. | |
| 2002/0133264 A1* | 9/2002 | Maiteh | G05B 19/4097 |
| | | | 700/182 |
| 2005/0166413 A1* | 8/2005 | Crampton | B25J 13/088 |
| | | | 33/503 |
| 2013/0002250 A1* | 1/2013 | Morgan | G01R 33/46 |
| | | | 324/315 |
| 2013/0089642 A1* | 4/2013 | Lipson | A23P 20/20 |
| | | | 426/115 |
| 2015/0176956 A1 | 6/2015 | Pettersson et al. | |
| 2016/0054722 A1 | 2/2016 | Jalluri et al. | |
| 2018/0113434 A1* | 4/2018 | Shapiro | G05B 19/406 |

\* cited by examiner

METHOD FOR GENERATING CNC MACHINE OFFSET BASED ON THERMAL MODEL

FIELD

The present disclosure relates to a method for determining an offset in a CNC machine due to thermal growth of one or more components.

BACKGROUND

The statements in this section merely provide background information related to the present disclosure and may not constitute prior art.

Generally, computer numerical control (CNC) machines execute preprogrammed sequence of commands to automate various machining operations. For example, drills, lathes, and water jet cutters can be configured as CNC machines. A CNC machine typically includes multiple components such as a motor, spindle, ballscrew, rotary axes, and column, and may be operable to orientate a work piece relative to a tool attached to the spindle before machining the work piece. Each of these components have different thermal expansion properties and can cause the CNC machine to become out of position.

To properly position the tool with a work piece, the CNC machine is calibrated with a machine reference point ("reference point" hereinafter) that serves as the origin point of the coordinate system used by the CNC machine. The reference point may be determined using a probing routine that utilizes a precision gage bore, which can be positioned on a fixture, and a touch probe attached to the spindle. During machining, the temperature can fluctuate due to heat caused by, for example, motor, cutting energy, idle operation and friction. The fluctuation in temperature can lead to thermal growth of various components, such as the spindle, the ballscrew, the rotary axes, and the column, and cause the reference point to shift. For example, in minimum quantity lubrication (MQL) machining, where flood coolant is minimal, thermal growth can be up to 100 μm. In high-volume production, frequent starts and stops of a machine occur due to various reasons, such as a machine being blocked, starved, a gantry issue, and shift change, which can also move the reference point due to thermal growth.

These offset adjustment issues, among other issues related to the performance and cycle time of CNC machine, are addressed by the present disclosure.

SUMMARY

In one form, the present disclosure provides for a method for compensating for thermal variations in a machine. The method includes instrumenting the machine with a plurality of temperature sensors, enclosing the machine in an environmentally controllable atmosphere, and mounting a calibration artifact into the machine. The method further includes soaking the machine at a plurality of predetermined ambient temperatures, probing the calibration artifact at the plurality of temperatures, and generating a thermal model of the machine based on the probing.

In another form, the present disclosure provides for a method for processing a workpiece in a machine. The method includes logging offset data of the machine over a period of operational time having varying thermal conditions, comparing the logged offset data against a thermal model, where the thermal model is generated based on a probing routine and dry cycling for a plurality of test cycles on a calibration artifact. Based on the comparing, the method estimates offsets for the machine and adjusts offsets of the machine during operation.

In yet another form, the present disclosure provides for a method for processing a workpiece in a CNC machine. The method includes logging offset data of the CNC machine during production operation over a period of time having varying environmental conditions. The method compares the logged offset data against a thermal model of the CNC machine during production operation, estimates offsets for the CNC machine based on the comparing; and adjusts offsets of the machine during production operation such that the CNC machine is adjusted without experiencing downtime.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way. It should be understood that throughout the drawings, corresponding reference numerals indicate like or corresponding parts and features.

DETAILED DESCRIPTION

The following description is merely exemplary in nature and is not intended to limit the present disclosure, application, or uses.

In a manufacturing environment, CNC machines are generally required to perform one or more machining operations on a work piece within a designated cycle time. To address the shift in the reference point, manufacturers of CNC machines may interrupt machining operations to perform gage bore probing to identify the thermal growth and compensate accordingly. While gage probing may address the shift, it can take up cycle time and is typically considered a non-value add operation in manufacturing, and yet it considers only one or a limited number of cutting planes. Accordingly, frequent probing increases cycle time and is a disadvantage in mass production.

The present disclosure is directed toward a method for compensating for an offset of the CNC machine using a predetermined thermal model, and does not require high precision gage probing that may take up valuable machining time. Specifically, a thermal offset calibration process of the present disclosure is stored and executed by a controller of the CNC machine to estimate an offset of the CNC machine based on a thermal model stored in the CNC machine and on other data, such as temperature and stored offset(s). The process may then adjust the CNC machine so that the origin of the coordinate system aligns with the original reference point. A detailed explanation of the thermal offset calibration will now be provided with reference to drawings.

Figure 1:
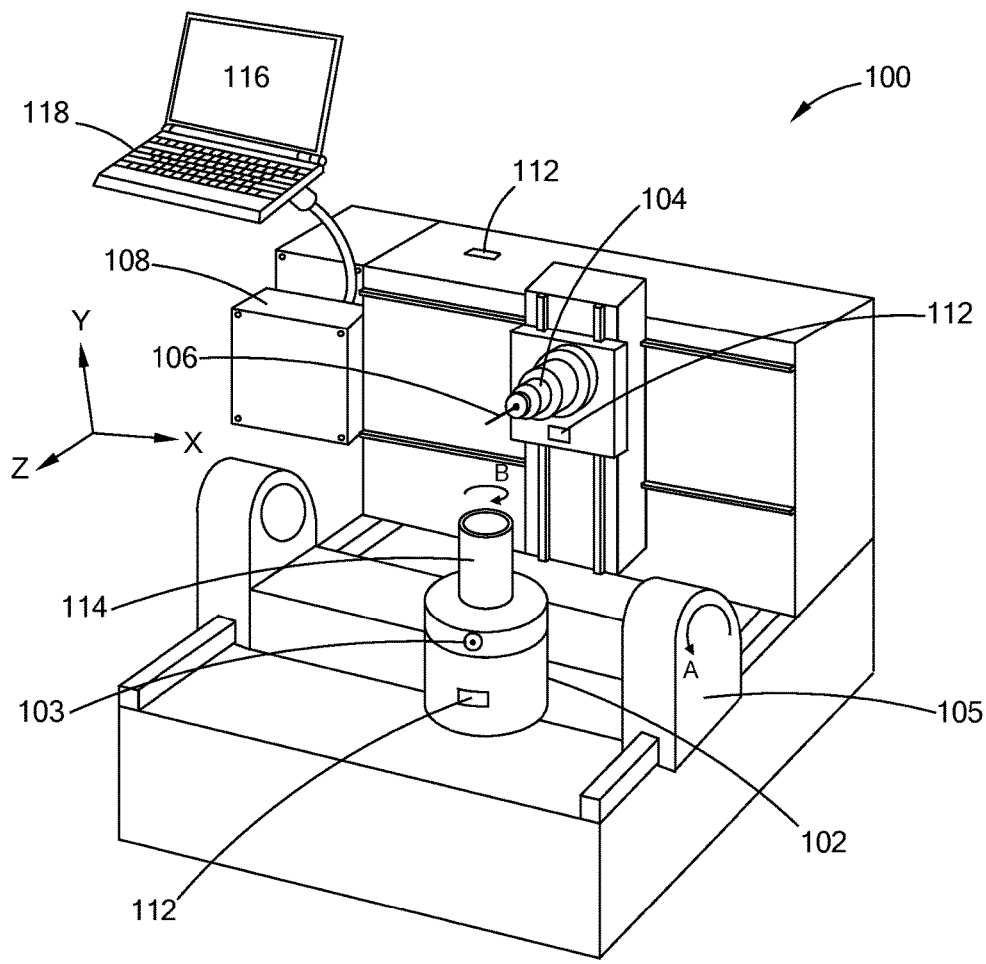
FIG. 1 is schematic view of a CNC machine having a controller constructed according to the teachings of the present disclosure.

Referring to FIG. 1, a CNC machine 100 is shown that includes a table 102 having a precision gage bore 103, a spindle 104, a trunnion 105, a tool 106 disposed at the end of the spindle 104, a controller 108, one or more user interfaces 110 that is communicably coupled to the controller 108, and one or more temperature sensors 112 according to the teachings of the present disclosure. The spindle 104 is generally operable to move relative to a work piece 114 disposed on the table 102 along the X, Y, Z axes. The part is generally operable to orient using A, B axes to present the part face/plane that needs machined. The tool 106 may be operable to rotate about the Z-axis and apply a force onto the work piece 114 to perform a machine operation, such as drilling bore through the work piece 114. The CNC machine 100 may be configured to have multiple tools such that the spindle 104 is operable to switch between the tools in between non-machining operations.

The temperature sensors 112 measure ambient temperature and may be positioned at different locations of the CNC machines 100, such as the spindle 104, the table 102, machine base (not shown), ballscrew (not shown), and other suitable locations, which may be determined according to a method of the present disclosure as set forth in greater detail below. The temperature sensor 112 may output data to the controller 108 at a fixed interval throughout machining and non-machining operations. Alternatively, the temperature sensors 112 may output data at a fixed operation time such as at the start and stop of designated operations, and/or when requested by the controller 108.

The CNC machine 100 may be operable by a user, such a machine operator, via the user interface 110. In the illustrated form, the user interface 110 includes a monitor 116 that may display a graphical user interface, and a keyboard 118. The user interface 110 may include other components, such as a mouse, a touchscreen display, and other suitable devices for operating the CNC machine 100.

The controller 108 controls the operation of the CNC machine 100 based on inputs received and on predetermined programs stored and executed by the controller 108. The controller 108 may be in communication with various external devices via wired and wireless communication. For example, the controller 108 may be communicably coupled to the user interfaces 110 and the temperatures sensors 112 by way of a communication port and cable and/or through wireless communication by way of a transceiver (e.g., Bluetooth, ZigBee, and/or Wi-Fi). The controller 108 may communicate with other external devices such as servers located external of the CNC machine 100, and external memory, among others.

Figure 2:
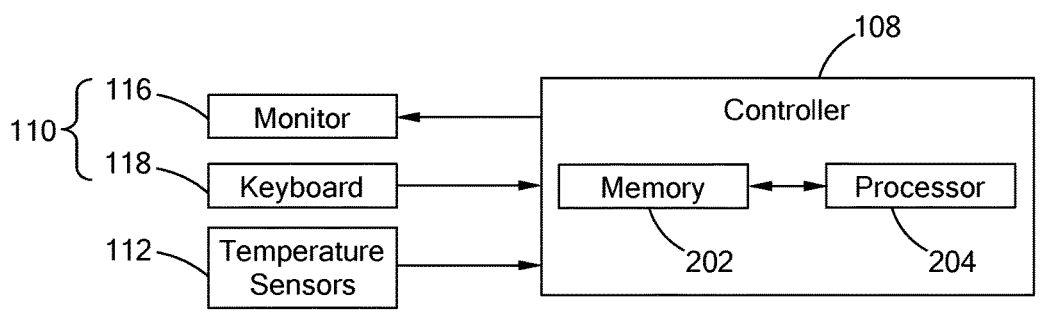
FIG. 2 is a block diagram of the controller of the CNC machine of FIG. 1.

With reference to FIG. 2, the controller 108 may include memory 202 (e.g., RAM, ROM, EPROM, and/or EEPROM) that stores control programs, and a processor 208 for executing the programs in the memory 202. Some of the programs are directed toward one or more machining operations to be performed by the CNC machine 100, and may control the CNC machine 100 to, for example, place the work piece 114 on the table 102, machine the work piece, rotate the work piece 114, and move the work piece 114 from the table 102. Other programs may be directed toward non-machining operations, such as the thermal offset calibration process, to adjust for an offset caused by thermal growth of one or more components of the CNC machine 100, as described in detail herein. In addition to the control programs, the memory 202 may also store other information, such as data inputted by the user via the user interfaces 110, temperature detected by the temperature sensors 112, and prestored data such as calibrated position information of the gage bore 103 and a thermal model.

As described above, components of the CNC machine 100 may experience thermal growth causing the reference point of the machine coordinate system to shift. To compensate for this shift, the controller 108 executes the thermal offset calibration process in which the controller 108 estimates an offset of the CNC machine 100 using a predetermined thermal model and logged offset data, and then adjusts for offset such that the work piece is aligned relative to, for example, the tool 106 based on the reference point.

The thermal model characterizes the thermal growth of the CNC machine 100, and is used to estimate machine growth offset along one or more axes at a given temperature, and machine state (e.g., warm-up time, and break time, etc). One factor in formulating the thermal model includes evaluating the effect that temperature has on the thermal growth of one or more components of the CNC machine 100. To do this, the CNC machine 100 may undergo one or more thermal based experiments in which the environmental condition of the CNC machine 100 is controlled and the thermal growth of key components are measured.

Figure 3:
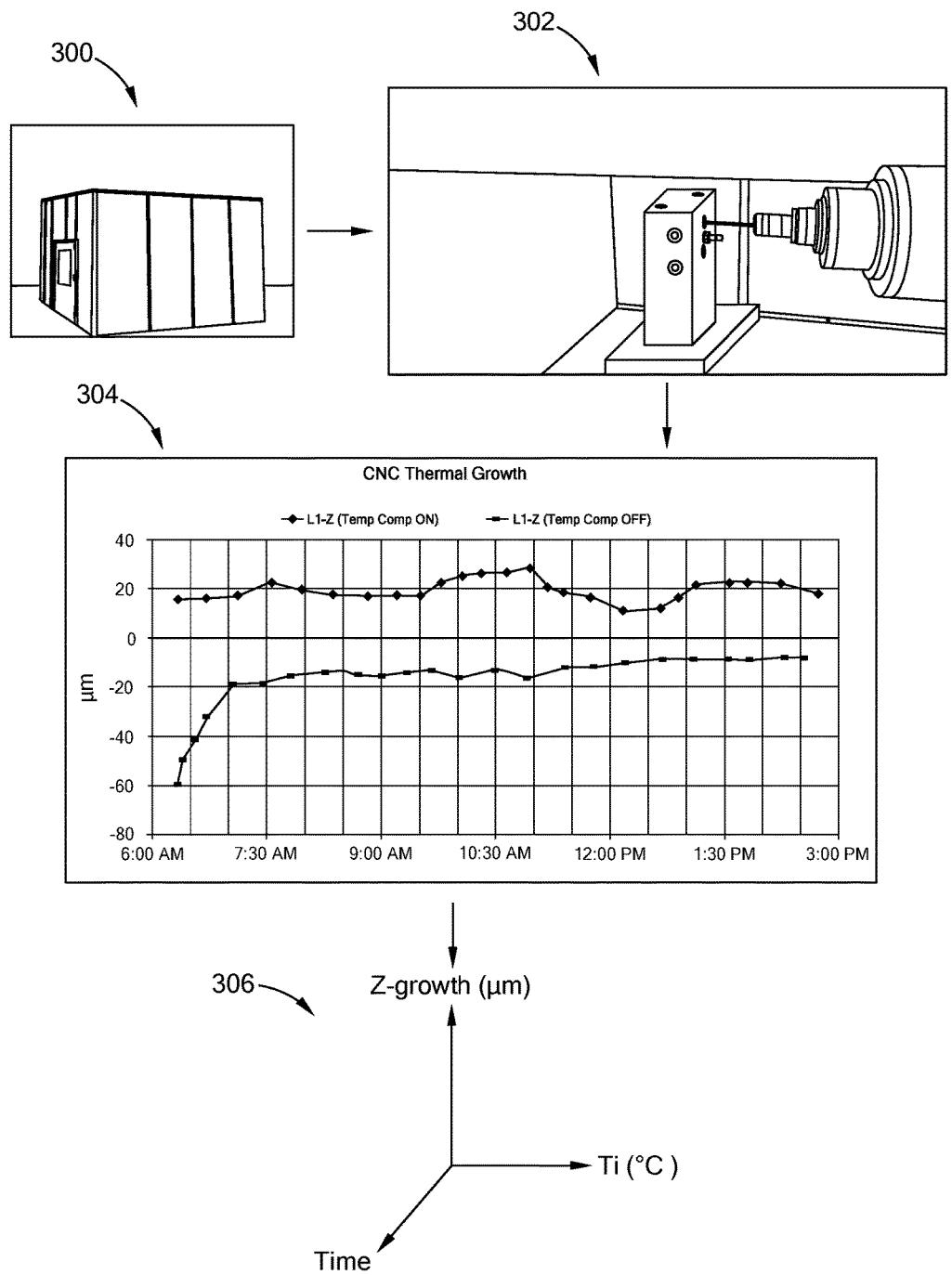
FIG. 3 illustrates a thermal characterization process according to the teachings of the present disclosure.
Figure 4:
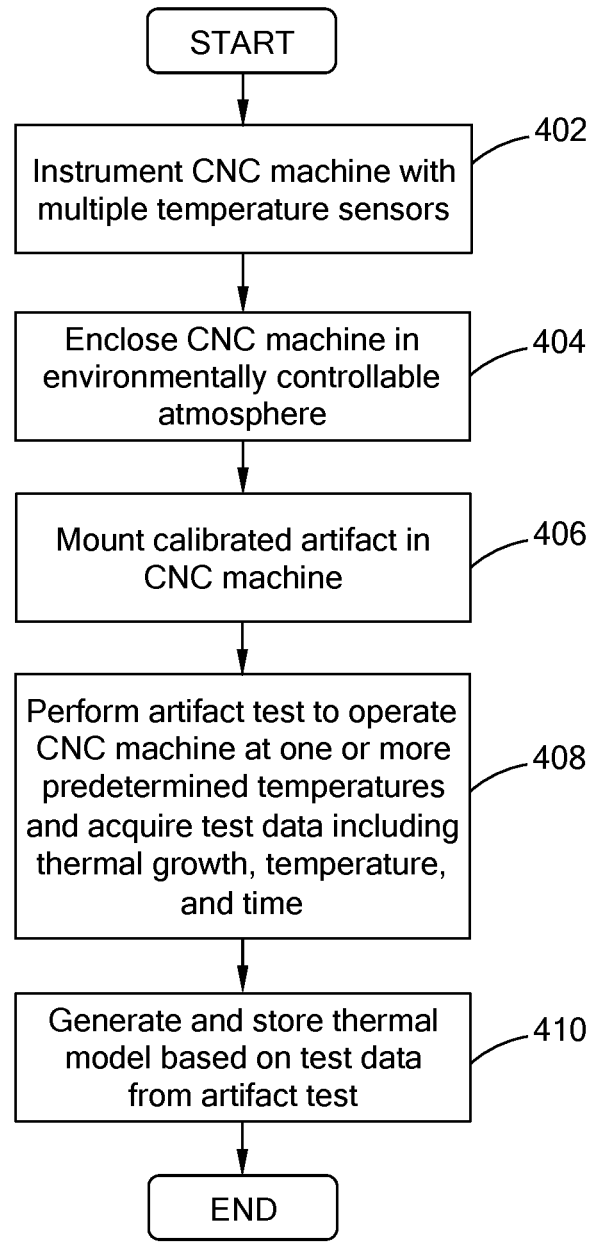
FIG. 4 is a flowchart of an example thermal characterization process according to the teachings of the present disclosure.

FIG. 3 illustrates a thermal characterization process, and FIG. 4 is a flowchart of an example thermal characterization process. The thermal characterization process may be performed at, for example, the original manufacture of the CNC machine 100 or at the manufacturing facility utilizing the CNC machine 100. In either situation, the characterization is performed before the thermal offset calibration process. In addition, before the thermal characterization is conducted, a high precision gage probing may be performed to calibrate the reference point of the CNC machine 100.

To monitor temperatures, the CNC machine 100 is instrumented with various sensors such as multiple temperature sensors placed at various positions about the machine 100, at 402. To effectively regulate the ambient temperature, the CNC machine 100, at 404, may be enclosed in an environmentally controllable atmosphere such as a tent (image 300 of FIG. 3).

A calibration artifact, such a rectangular block shown in image 302 of FIG. 3, may be mounted in the CNC machine 100, at 406. The calibration artifact has precise dimensions that are known, and may be formed of material having low coefficient of thermal expansion. The artifact may include multiple bores on different faces of the artifact.

The CNC machine 100 and the artifact are then soaked at one or more predetermined ambient temperatures and the artifact is probed at each temperature to ascertain the location of one or more bores, at 408. Specifically, the CNC machine 100 undergoes an artifact test, at 408, in which the ambient temperature is adjusted to simulate different environmental conditions, such as winter, spring, summer and fall. The artifact test may also include probing the artifact at different temperatures and different machine states to measure the location of the bore center and/or the bore depth of one or more of the bores along the artifact (e.g., image 302 of FIG. 3 illustrates an artifact being probed). The test may also measure other positions, such as the top and bottom sides of the artifact.

The artifact test may also execute a dry cycle in which the CNC machine 100 is controlled to carry out one or more machining operations without a work piece and tool. That is, the CNC machine 100 simulates machining operations which may include rotating the spindle 104 and relocating a work piece by performing the required movement without the work piece, all of which can affect the thermal growth of the components. In addition to the machining operations, the dry cycle may also include non-machining operations such as tool changes, rapid feeds, and/or A/B indexing of different angular index positions and combinations of the trunnion 105 (A-axis) and the table 102 (B-axis) that sits on the trunnion 105. After the dry cycle, the artifact test probes the artifact again. Addition detail regarding such temperature controlled artifact test for characterizing thermal growth is described in U.S. patent application Ser. No. 14/463,988, which is commonly assigned with the present application and the contents of which are incorporated herein by reference in its entirety.

The artifact test may provide insight in the thermal growth of, for example, sensitive components of the CNC machine 100, and for identifying locations about the CNC machine 100 that are ideal for accurately detecting the ambient temperature. For example, graph 304 in FIG. 3 illustrates an expected thermal growth from a thermal study in which a temperature compensation, which is used to adjust for any offset, is turned off for one data set and turned on for another data set. As shown, without any thermal compensation the thermal growth offset varies significantly from the true measurement.

The artifact test may also be used to generate subsystem thermal models for sensitive components, such as spindle, trunnion, ballscrew, which can provide further understanding in the course thermal growth of such components. For example, a cutting spindle, which takes the direct cutting load, may heat up at quickly than other components, and as a result, grows as the temperature increases. The cutting spindle may be studied by placing one or more sensors on the spindle, exercising only the spindle, and then developing a spindle only thermal model based on the data collected. Probe or other systems can be used to measure spindle growth. Other machine components such as part table, fixture, column and bed, which are not directly involved in cutting, may be studied by soaking them in different ambient temperatures.

Using the data gathered from the artifact test, a thermal model is generated and stored in the controller 108 of the CNC machine 100, at 410. The model includes the thermal growth of the CNC machine 100, which is determined as growth offsets measured along, for example, a Cartesian coordinate system based on the locations measured on the artifact (e.g., bore center and depth) during the artifact test and on known locations of the artifact. For example, the difference between each measured location and its respective known location is identified as a growth offset for that bore. The growth offset is associated with the temperature and machine state associated with the measured location. The thermal model associates the thermal growth, the temperature, and time (e.g., plot system 306 of FIG. 3), and is used to estimate machine growth offset at a given temperature and known machine state (e.g., warm-up, steady state, cool down stage, and break-time).

When the CNC machine 100 is in operation, the controller 108 routinely performs the thermal offset calibration process to correct the offset of the CNC machine 100. The frequency at which the controller 108 executes may be dependent on the environmental and operating state that the CNC machine 100 has undergone. Specifically, the process may be performed when the CNC machine 100 has experienced various operating scenarios, such as starts, stoppages, continuous run time, and temperature swings. Thus, if the CNC machine 100 experiences such scenarios after two days of operation, the frequency can be set for every week or every month. The frequency may also be adjusted via the user interface, and therefore, is customized for each CNC machine.

Figure 5:
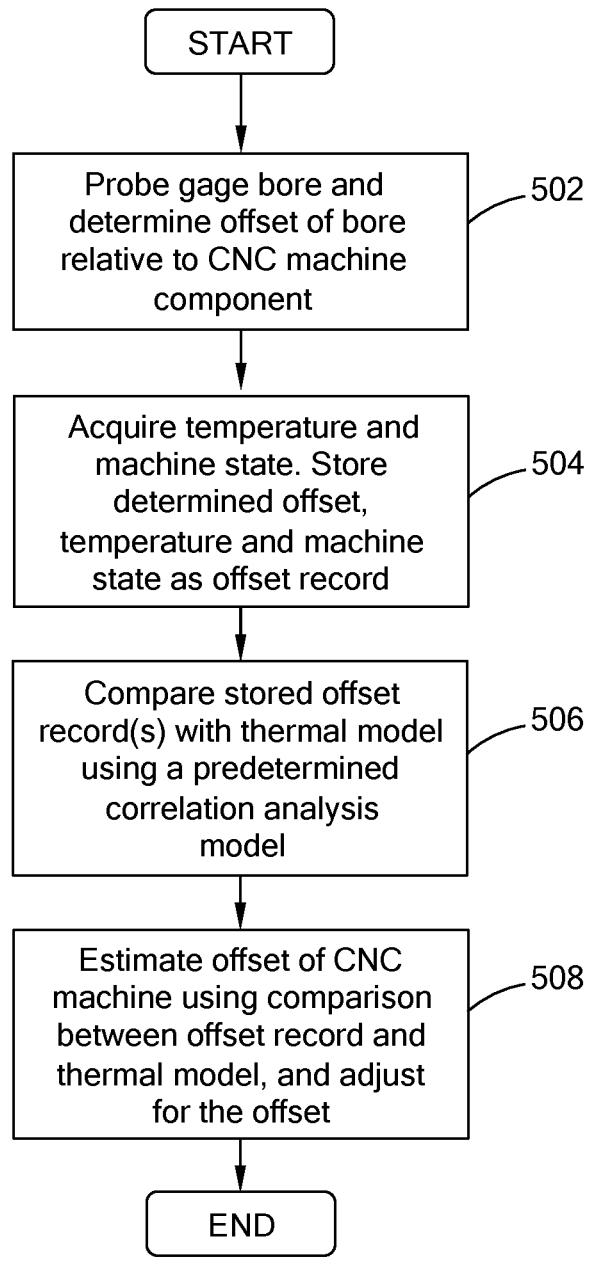
FIG. 5 is a flowchart of an example of a thermal offset calibration process according to the teachings of the present disclosure.

FIG. 5 provides an example of a thermal offset calibration process executed by the controller 108, and in one form of the present disclosure, is performed at a non-machining operation state of the CNC machine 100 during production, such as retooling, steady state, etc. That is, the CNC machine 100 is not taken off-line like in the high precision gage probing, and is adjusted during a non-machining operation of production.

At 502 of FIG. 5, the controller 108 determines an offset of the precision gage bore 103 relative to a component of the CNC machine 100. For example, the controller 108 executes a probing routine to determine the location of the bore 103 (e.g., X, Y, Z positions) relative to the spindle 104 and saves the location as a measured location in the memory 202. The controller 108 then determines the offset of the bore 103 relative to the spindle 104 by subtracting the measured location from a known location stored in the memory 202. While the offset data is based on the spindle 104, other components of the CNC machine, such as ballscrew, trunnion, column, and table, may also be used.

The controller 108 then acquires the ambient temperature from the one or more temperature sensors 112 and a machine state of the CNC machine 100, and stores or logs the offset data determined at 502 with the temperature and machine state acquired in the memory 202, as an offset record, at 504. The controller 108 may continue to store the offset record even after the process is complete for use for future offset calibration processes. The machine state may be inputted by the machine operator via the user interface.

At 506, the controller 108 compares the logged offset record(s) against the thermal model based on a correlation analysis model. In an example embodiment, the controller 108 uses regression analysis as the correlation analysis model. Regression analysis is a known statistical process that can be used to estimate the relationship between a dependent variable and one or more independent variables. For example, here, the dependent variable may be the offsets of the reference point of the CNC machine 100 along the positioning axes (e.g. X, Y, Z), and the independent variables may include temperature and machine state. The controller 108 may also use other methods for comparing the logged offset record against the thermal model. For example, in addition to or in lieu of regression analysis, the controller 108 may use principal component analysis, look-up tables, and other suitable data analytics methods.

At 508, the controller 108 estimates the offsets of the CNC machine 100 and the adjusts for the offsets during the machining operation. For example, if using regression analysis, the controller 108 generates regression equations that are used to estimate the offsets of the CNC machine 100 along the positioning axes (e.g. X, Y, Z). For instance, equations 1 to 3 are example equations for determining the offsets based on the temperatures of the bed and spindle (i.e., $T_{bed}$ and $T_{spi}$). With the estimated offsets, the controller 108 is able to compensate for the shift in the reference point during normal machining operations. For example, the controller 108 calculates the offsets and applies them by adjustments of positions in a CNC program stored in the controller 108. It should be readily understood that the specific coefficients and constants provided in equations 1 to 3 are dependent upon the offsets measured, and therefore, the present disclosure should not be restricted to the specific values provided in the equations.

$$x\text{-offset} = 0.0400 - 0.00160 T_{bed} + 0.00303 T_{spi} \quad R^2 = 0.85 \qquad \text{Equation 1}$$

$$y\text{-offset} = 0.300 - 0.02357 T_{bed} + 0.00121 T_{spi} \quad R^2 = 0.955 \qquad \text{Equation 2}$$

$$z\text{-offset} = 0.1661 - 0.00734 T_{bed} + 0.00541 T_{spi} \quad R^2 = 0.879 \qquad \text{Equation 3}$$

Based on the foregoing, the thermal offset calibration process compensates for the shift in the CNC machine without having to perform the time consuming high precision gage probing process and substantially reduces the cycle time needed to correct the reference point. That is, in one form of the present disclosure, the thermal offset calibration process is performed during a non-machining operation of production, such as tool change. The temperature compensation routine described herein utilizes a predetermined thermal model for estimating the offset in lieu of performing high cost probing routine.

It should be readily understood that the steps described with regard to the processes illustrated in FIGS. 4 and 5 may be modified and should not be limited to the example provided herein. For example, with regard to FIG. 4, the artifact may be positioned in the CNC machine before the CNC machine is enclosed in environmentally controllable atmosphere, and in FIG. 5, the controller may be configured to estimate the offset and adjust the CNC machine after a certain number of measured offset records are first logged into the system.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of compensating for thermal variations in a machine comprising:
   instrumenting the machine with a plurality of temperature sensors;
   enclosing the machine in an environmentally controllable atmosphere;
   mounting a calibration artifact into the machine, wherein the calibration artifact has precise dimensions that are known;
   soaking the machine at a plurality of predetermined temperatures;
   probing the calibration artifact at the plurality of temperatures; and
   generating a thermal model of the machine based on the probing.

2. The method according to claim 1, wherein the probing comprises a probing routine and dry cycling for at least one test cycle.

3. The method according to claim 1, wherein the plurality of predetermined temperatures simulates four (4) seasons of winter, spring, summer, and fall.

4. The method according to claim 1, wherein the calibration artifact is a material with low coefficient of thermal expansion.

5. The method according to claim 1, wherein the instrumenting comprises instrumenting components of the machine and generating a thermal model of the components.

6. The method according to claim 1, wherein the machine is a CNC machine.

7. The method according to claim 6, wherein the instrumenting comprises instrumenting at least one component of the CNC machine and generating a thermal model of the at least one component.

8. The method according to claim 7, wherein the component is selected from the group consisting of a spindle, a ballscrew, a part table, a trunnion, a column, a bed, and a fixture.

9. The method according to claim 6, further comprising:
   logging offset data of the CNC machine during production operation over a period of time having varying environmental conditions;
   comparing the logged offset data against the thermal model of the CNC machine during production operation;
   estimating offsets for the CNC machine based on the comparing; and
   adjusting offsets of the CNC machine during production operation such that the CNC machine is adjusted without experiencing downtime.

10. The method according to claim 9, wherein the logged offset data is based on at least one component of the CNC machine, and the at least one component is selected from the group consisting of a spindle, a ballscrew, a part table, a trunnion, a column, a bed, and a fixture.

11. The method according to claim 9, wherein positions of the temperature sensors are adjusted based on the comparing and the thermal model.

12. The method according to claim 9, wherein additional temperature sensors are positioned on the CNC machine based on the comparing and the thermal model.

13. The method according to claim 1, wherein the thermal model includes machine growth in a multi-axis coordinate system.

14. The method according to claim 1, further comprising:
   logging offset data of the machine over a period of operational time having varying thermal conditions;
   comparing the logged offset data against the thermal model;
   estimating offsets for the machine based on the comparing; and
   adjusting offsets of the machine during operation.

15. The method according to claim 14, wherein the comparing is conducted using at least one of regression analysis, principal component analysis, and look-up tables.

16. The method according to claim 14, wherein the machine is a CNC machine, and the logged offset data is based on at least one component of the CNC machine.

17. The method according to claim 16, wherein the component is selected from the group consisting of a spindle, a ballscrew, a part table, a trunnion, a column, a bed, and a fixture.

18. The method according to claim 14, wherein positions of the temperature sensors are adjusted based on the comparing and the thermal model.

19. The method according to claim 14, wherein the offsets are based on a multi-axis coordinate system.

20. A part manufactured according to the method of claim 14.

* * * * *